July 31, 1951 — W. A. FLYNN — 2,562,352
CONNECTING ROD BEARING RETAINER
Filed June 14, 1947
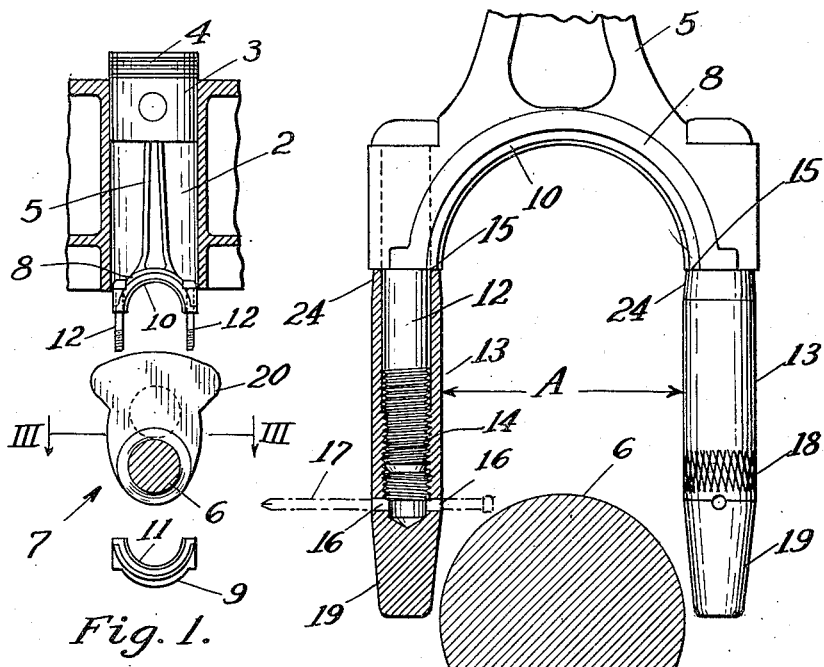
Fig. 1.
Fig. 2.
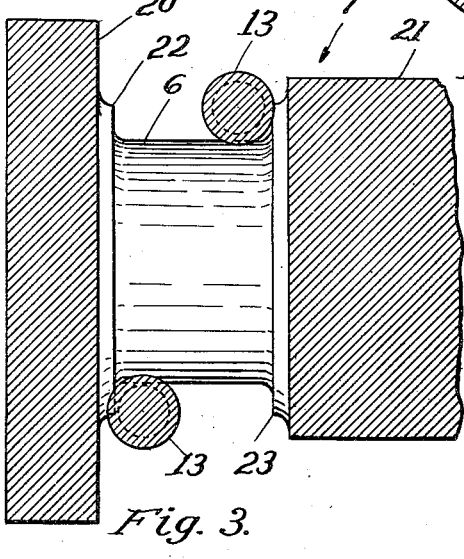
Fig. 3.
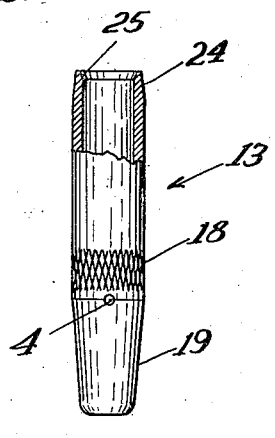
Fig. 4.
Inventor
William A. Flynn
By Christy Parmelee and Strickland
his Attorneys Patented July 31, 1951

2,562,352

UNITED STATES PATENT OFFICE 2,562,352

CONNECTING ROD BEARING RETAINER

William A. Flynn, Pittsburgh, Pa., assignor of one-half to James B. Flynn, Chicago, Ill.

Application June 14, 1947, Serial No. 754,639

3 Claims. (Cl. 29—285)

My invention relates to reciprocating engines, particularly to internal combustion engines of the type found in the modern motor car, and the invention consists in certain new and useful improvements in a device for retaining and aligning the connecting rod bearings of such engines when assembling the connecting rods with their crank shaft.

The device of the invention is especially valuable in the case of connecting rods having insert bearings, that is, prefabricated bearings that are inserted in the bearing bosses of the connecting rods, as distinguished from bearings which are integrally cast and shaped in the bosses. Insert bearings present a difficult problem during the assembly of the connecting rods of an engine with the crank shaft, as is necessary when re-assembling an engine after making any of the usual repairs that require the removal of the engine pistons from their cylinders. For example, an insert bearing comprises essentially a semicylindrical shell formed of bearing metal, and this shell is received in a semicylindrical seat formed in the bearing boss of a connecting rod. In service this bearing snugly fits the journal on the crank shaft to which the connecting rod is secured, and a complementary bearing of semicylindrical form is provided in a bearing cap which is secured by bolts to the connecting rod boss, thus completing the embrace of the crank shaft journal by the bearing structure. The problem to which this invention is directed concerns the insert bearing portion that is positioned in the bearing boss of a connecting rod, and in the ensuing specification the references to a bearing or an insert bearing contemplate such an insert bearing portion on the connecting rod, as distinguished from the bearing portion in the cap.

The problem referred to will be understood upon considering how a piston is forced into its cylinder by tapping the top of the piston with a mallet or other suitable implement, this tapping or hammering being practically necessary because the modern piston rings, with the conventional ring expanders, require a relatively great force to effect the entrance of the piston to the cylinder. During this operation the connecting rod, pivoted at its upper end to the piston, hangs downward in the cylinder and crank case beneath the piston, and under the effect of the blows delivered upon the top of the piston the insert bearing in the depending end of the connecting rod becomes loose and falls out.

When an insert bearing falls out, it becomes necessary to push the piston upward in the cylinder a sufficient distance to permit the connecting rod to be swung sideways from the position above the journal of the crank shaft upon which the bearing is to be assembled, this swinging aside of the connecting rod being necessary in order to provide clearance for the mechanic to reach in with his hand and re-introduce the insert bearing to the bearing boss on the connecting rod. This operation of moving the piston upward in the cylinder, to permit such re-introduction of the insert bearing, it a very difficult task, because the piston at such time is usually located near the bottom of the cylinder where the piston is particularly tight, it being understood that wear between piston and cylinder is minimum in the bottom of the cylinder, wherefore a piston equipped with the expander type of rings tends to bind or lock in the cylinder at this point. My invention consists in means for eliminating this difficulty. Additionally, the means of the invention are useful in aligning the bearing with its crank shaft journal, as will appear in the ensuing specification.

The invention will be understood upon reference to the accompanying drawings, in which:

Fig. 1 is a diagrammatic view showing an automobile engine fragmentarily in vertical section, the plane of section extending transversely of the crank shaft of the engine and on the axis of one of the cylinders;

Fig. 2 is a fragmentary view, showing the lower end of the connecting rod, appearing in Fig. 1, to much larger scale, and illustrating in association therewith means embodying my invention;

Fig. 3 is a fragmentary view of the crank shaft of the engine showing a crank shaft journal (which receives the connecting rod bearing) as it appears on the plane III—III of Fig. 1, but to larger scale, and illustrating in engagement therewith a pair of bearing retaining and aligning devices of the invention; and Fig. 4 is a view of one of such devices, shown partly in side elevation and partly in axial section, and illustrating a modification in structural detail.

Referring to the drawings, an engine cylinder 2 is shown with a piston 3 in position to be completely entered into the cylinder, the usual piston ring clamp that holds the piston rings 4 compressed while the piston is forced downward into the cylinder being omitted from this showing. The connecting rod 5 depends from the piston, and the journal 6 of the crank shaft 7 is positioned in lower dead center, ready to receive the bearing-equipped boss 8 at the lower end of the connecting rod, it being understood that the bearing cap 9 was removed from the connecting rod before the assembling operation was commenced. The boss 8 includes a substantially semi-cylindrical bearing portion or insert 10 and the cap 9 includes an insert bearing 11.

It is customary, if not essential, to leave the bearing bolts or studs 12 in position in the bearing boss 8 on the connecting rod while making the assembly, for in this way, once the bearing has been properly positioned on the journal 6, it is merely necessary to apply the bearing cap 9 upon the bolts 12, which then extend below the journal, and to run home nuts (not shown) upon the ends of the bolts.

The device of the invention consists in a pair of bearing retainer elements, which advantageously take the form of dowel members 13 adapted to be secured to the connecting rod in position to project therefrom in a direction tangent to the bearing 10 assembled therewith. The dowel members 13 consist in this case of tubes of brass or other suitable material; the tubes are internally threaded, as at 14, to permit them to be screwed upon the bearing bolts 12 as indicated in Fig. 2; the external diameter of the tubes 13 is such that, when the tubes are screwed all of the way upon the bolts 12, the upper edges of the tubes overlie the diametrical edges 15 of the bearing insert 10, and thus operate to clamp the insert bearing rigidly in place in the bearing boss of the connecting rod. It may be noted that each dowel element 13 may include aligned perforations 16, in order that a rod or nail 17 (indicated in dotted lines) may be inserted to provide a wrench for use in tightening the devices upon the bolts 12, and to give the mechanic a handle to use in pulling downward on the connecting rod and piston while making the assembly.

While the tubular devices 13 may be open from end to end, to prevent the accumulation of dirt within them, they may be formed closed at their outer ends as herein shown. The outer surface of each dowel element 13 may be cylindrical through the major portion of its extent, and may be knurled as indicated at 18. The outer or distal end of each element is tapered, as at 19, forming a lead portion for guiding or entering the bearing-equipped end of the connecting rod into proper position upon the journal 6 between the counter-balances 20 and 21 of the crank shaft. In the event that the piston and connecting rod are turned on the axis of the piston so that the axis of the insert bearing 10 is out of alignment or parallelism with the axis of the journal 6, the tapered lead ends of the dowel elements 13 will be canted relatively to one another as they move between the counter-balances 20 and 21 and make contact with the journal. Fig. 3 illustrates an extreme condition of misalignment. As the piston is moved downward in the cylinder the dowel elements 13 straddle the journal 6 and in case of misalignment the tapered lead ends of the descending dowel elements bear upon the opposite sides of the journal and exert a twisting effect upon the dowel elements, which twisting effect reacts to turn the connecting rod and the piston into a position wherein the bearing 10 is aligned with the journal. It will be understood that the distance A between the cylindrical body portions of the dowel elements 13 is equal to the diameter of the journal 6 (and of the bearing 10 that engages it), wherefore the only condition under which the dowel elements will straddle the journal without exerting a twisting effect is when the dowel elements are aligned on opposite sides of the journal in a plane that extends transversely of and normal to the axis of the journal. Thus, if there be misalignment of the bearing, the bearing, retainer dowel elements 13 are effective to exert a twisting force which is effective, as the piston and connecting rod are forced downward, to bring the bearing 10 into alignment with the journal 6. This action is effective to prevent the edges of the insert bearing from striking the edges of the lateral bearing abutments 22 and 23 of the counter-balances of the crank shaft, in consequence of which the bearing would be marred to an extent that would require renewal. In order to prevent interference between the edges of the bearing abutments 22 and 23 and the dowel elements, the inner or proximate ends of the dowel elements are provided with a slight external taper 24. The taper 24 on each dowel element has another utility: If the bolts 12 should happen to be out of alignment, the tapers 24 provide a clearance between the dowel elements immediately below the edges of the bearing 16, and during the assembly of the connecting rod with the journal 6 this clearance permits the connecting rod to center itself relatively to the journal as it reaches the position in which the bearing 10 approaches seated position on the journal. Furthermore, if the studs or bolts 12 have a fillet at the point where they extend from the connecting rod, each dowel element will be provided with a tapered rebate or enlargement 25 at the mouth of its bore, as shown at 25 in Fig. 4.

After the bearing on the connecting rod has been positioned accurately upon the journal 6, the dowel elements are removed from the bolts 12, and the bearing cap 9 is applied and secured.

The dowel elements may be also used when an engine is being taken down for repair. When the cap 9 of a connecting rod bearing has been removed, a pair of elements 13 may be applied to the studs or bolts 12 on the connecting rod, to lock the insert bearing in place before removing the piston and connecting rod, and this will serve to prevent the oil film between the bearing and the journal from drawing or holding the bearing away from the connecting rod boss 8 when the piston and connecting rod are removed. In this way the bearing is prevented from falling to the floor of the shop and becoming fouled with dirt or becoming confused with other bearings, which happens when several bearings are dropped from their connecting rods in a repair station. Proper alignment of bearings cannot be destroyed if the bearings are held in place in their connecting rod.

Within the terms of the appended claims various changes and modifications will be found to lie within the spirit of the invention.

I claim:

1. For use on a connecting rod having a substantially semi-cylindrical bearing portion to be aligned with and applied to a crank-shaft journal and provided on each of the opposite sides of said bearing portion with a projecting bearing bolt, a pair of dowel elements having hollow and elongate bodies arranged to be secured one upon each of said bolts the outside diameter of the dowel elements being such that when the dowel elements are secured on said bolts the distance between the dowel elements is equal to the diameter of the semi-cylindrical face of said bearing portion, said dowel elements having external surface portions that taper convergently toward the distal ends of the dowel elements, the bore in the hollow body of each of said dowel elements being threaded in a medial portion of its extent for threaded engagement with one of said bolts and being of relatively large diameter from said threaded portion to the proximate end of the dowel element for free passage over the body of the bolt to which it is to be secured.

2. For use on a connecting rod having a substantially semi-cylindrical bearing portion to be aligned with and applied to a crank-shaft journal and provided on each of the opposite sides of said bearing portion with a projecting bolt, a dowel element having a hollow and elongate body arranged to be secured to one of said bolts, said dowel element having a body portion with an outside diameter such that when a dowel element is secured on each of said bolts the distance between the two dowel elements is equal to the diameter of the crank-shaft journal on which said bearing portion is to be applied, said dowel element having an external surface portion that tapers convergently from said body portion toward the distal end of the dowel element, the bore in the hollow body of said dowel element being threaded in a medial portion of its extent for threaded engagement with one of said bolts, and being of relatively large diameter from said threaded portion to the proximate end of the dowel element for free passage over the body of the bolt to which it is to be secured.

3. For use on a connecting rod having a substantially semi-cylindrical bearing portion to be aligned with and applied to a crank-shaft journal and provided on each of the opposite sides of said bearing portion with a projecting bolt, a dowel element having a hollow and elongate body arranged to be secured to one of said bolts, said dowel element having a body portion with an outside diameter such that when a dowel element is secured on each of said bolts the distance between the two dowel elements is equal to the diameter of the crank-shaft journal on which said bearing portion is to be applied, said dowel element having an external surface portion that tapers convergently from said body portion toward the distal end of the dowel element, the bore in the hollow body of said dowel element being threaded in a medial portion of its extent for threaded engagement with one of said bolts.

WILLIAM A. FLYNN.

REFERENCES CITED

The following references are of record in the file of this patent:

UNITED STATES PATENTS

| Number | Name | Date |
|---|---|---|
| 41,170 | Reed | Jan. 5, 1864 |
| 162,077 | Kellogg | Apr. 13, 1875 |
| 295,612 | Bailey | Mar. 25, 1884 |
| 1,461,130 | Loughead | July 10, 1923 |
| 1,643,112 | Chisholm | Sept. 20, 1927 |
| 1,826,988 | Campbell | Oct. 13, 1931 |
| 2,051,953 | Leathers | Aug. 25, 1936 |

FOREIGN PATENTS

| Number | Country | Date |
|---|---|---|
| 555,398 | France | June 29, 1933 |